Feb. 18, 1941.   R. M. STONE ET AL   2,232,646
SEAT CUSHION
Filed July 22, 1938

INVENTOR
Richard M. Stone
AND
Alan E. Rathbun

BY

Ely & Frye
ATTORNEY

Patented Feb. 18, 1941

2,232,646

UNITED STATES PATENT OFFICE 2,232,646

SEAT CUSHION

Richard M. Stone and Alan E. Rathbun, Akron, Ohio, assignors to The Firestone Tire & Rubber Company, Akron, Ohio, a corporation of Ohio Application July 22, 1938, Serial No. 220,764

5 Claims. (Cl. 155—179)

This invention relates to seat cushions, more especially to seat cushions for use under varying atmospheric pressures, or load conditions.

Parachute seat cushions are a good example of cushions of the foregoing class and heretofore pneumatic parachute seat cushions have been provided so that the air pressure set up inside the seat cushion may be varied with changes in the atmospheric pressure existing at the different altitudes at which the parachute seat cushion is used. However, these cushions would collapse, or bottom frequently as well as easily being distorted out of shape when under low pressure.

The object of this invention is to overcome the foregoing and other objections to known types of parachute seat cushions and to provide a seat cushion for use under varying atmospheric pressures which cushion is positively prevented from bottoming or being distorted from its original shape while also being adapted for use under various atmospheric pressures.

Briefly stated, the invention comprises inserting a sponge rubber pad into a fabric cover that is rendered air-tight by spraying latex thereon. A valve is associated with the covering means so that the air pressure existing within the cushion may be varied, as desired. Thus the rubber pad gives the cushion a positive shape while the air pressure within the cushion can be varied to correspond to the atmospheric pressure.

Figure 4:
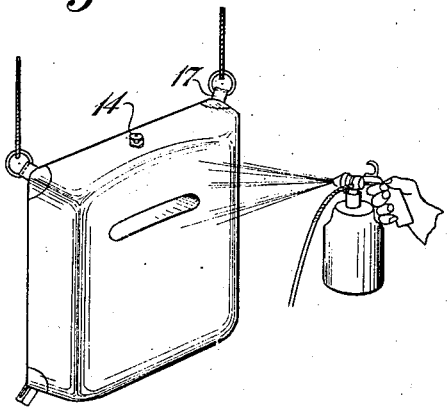
Figure 4 is a perspective view of a seat cushion in construction.
Figure 5:
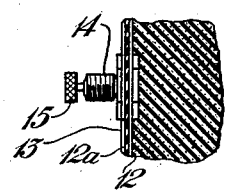
Figure 5 is a detail cross section of the valve means.

Referring specifically to the drawing, a sponge or cellular foam rubber pad 10, which may be made from other suitable resilient material, is provided as the body of the seat cushion of the invention. The pad 10 has a slot 11, preferably tapered, formed therein adjacent the front portion thereof. A fabric cover, or sheet 12, which may be provided with a skin rubber coating, is placed around the entire surface of the pad so as to leave the slot 11 exposed, as shown. This sheet usually should be made to substantially envelope form prior to inserting the pad 10 therein and the loose ends of the fabric sheet then are secured together and the edges of the cushion reenforced by any suitable means, such as a rubber gum strip 16 after the pad 10 is inserted therein. Next the seat is made air-tight and this comprises spraying a suitable viscous latex rubber composition thereon, as indicated in Figure 4. Care must be taken to cover all of the surface of the seat, and to saturate the seams in the sheet with the latex. Then the latex is dried to form an air-tight impervious rubber cover 12a around the pad 10, which rubber cover 12a is in addition to any rubber coating formed on the fabric sheet 12 before it is positioned over the pad 10. Additional coatings of latex composition may be applied to the cushion if desired.

The seat cushion may be finished by applying means such as a cover of fabric or other upholstery material, 13 about the rubber cover 12a. This affords an air circulating space outside of the impervious surface of the cushion and also prevents accumulation of moisture on the surface of the cushion.

Figure 1:
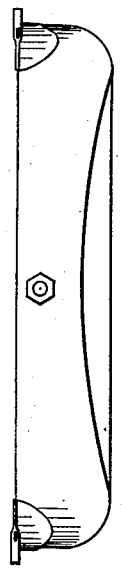
Figure 1 is a left-side elevation of Figure 2.
Figure 2:
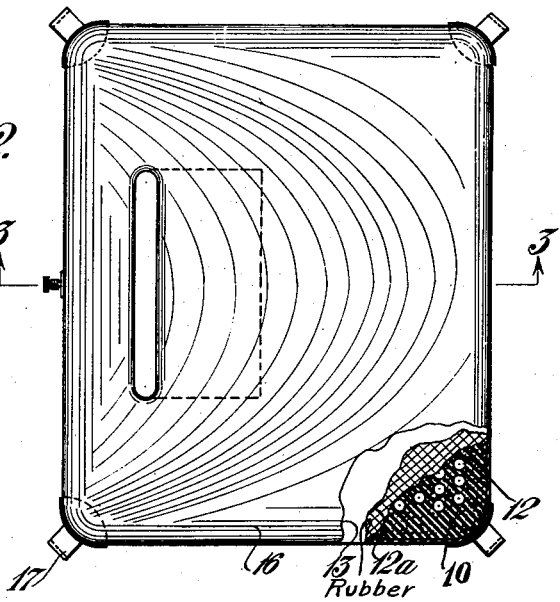
Figure 2 is an elevation of a seat cushion produced in accordance with the invention.
Figure 3:
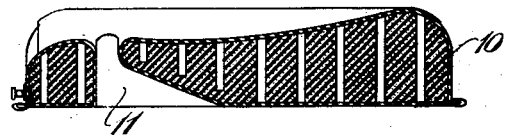
Figure 3 is a horizontal cross section on line 3—3 of Figure 2.

A valve 14 is secured to the fabric sheet 12, preferably prior to coating it with latex, and the valve extends through the upholstery material 13 to provide a passage for air into and from the pad 10. Figure 3 indicates the porous construction of the pad which readily permits the passage of air therethrough. Thus, air can be forced into the pad 10, when desired, to create a greater than atmospheric pressure therein although normally it suffices to have atmospheric pressure existing within the pad. The valve 14 is so constructed that by loosening the cap 15 and freeing the pad from load, the pad automatically brings itself to atmospheric pressure. Thus air can be valved out of the cushion at high altitudes to prevent over-inflation; air can then be admitted to the cushion again at lower altitudes merely by opening the valve while removing pressure from the cushion to permit the sponge rubber pad to expand and restore the normal amount of air in the cushion.

The pad should be provided with corner straps 17 that are secured to the fabric sheet 12 and that are used in associating the seat cushion with a parachute pack (not shown). Straps from the parachute extend through the tapered slot 11 to secure the cushion to the person wearing the parachute pack and the seat cushion of the invention thereby provides a comfortable support for a person sitting upon, or resting against a parachute pack.

While this seat cushion is particularly recommended for use with parachutes, it may be used as a regular seat cushion and the air pressure therein can be varied to provide varying degrees of resiliency in the support. Thus, it can be adapted to take varying sized loads and to suit different individuals with the air pressure coordinating with the rubber pad to provide a resilient support.

In accordance with the patent statutes, we have illustrated and described the structure and method of forming an embodiment of the invention. However, it will be understood that various modifications can be made without departing from the scope of the invention as defined in the appended claims.

What is claimed is:

1. A parachute seat cushion comprising a porous rubber pad having a tapered slot formed therein, a fabric sheet enclosing said rubber pad but leaving said slot exposed, means sealing the edges of said fabric sheet, a plurality of corner straps carried by said fabric sheet to aid in securing the seat to a parachute pack, an impervious latex rubber coating totally enclosing said pad and said fabric sheet, a fabric cover wrapper around said latex rubber coating, and valve means connecting said pad to the atmosphere whereby the air pressure within the seat can be varied.

2. A parachute seat cushion comprising a porous rubber pad having a slot having an edge which tapers downwardly towards the rear of the pad formed therein to aid in securing the cushion to another object, means forming an impervious layer over the entire surface of said pad but leaving the slot therein exposed, and a valve associated with said means whereby the quantity of air within said means can be varied but can also be maintained constant at any desired value regardless of the load applied to the seat cushion.

3. A parachute seat cushion comprising a porous rubber pad having a hollowed-out center portion and a slot extending therethrough adjacent the front edge of the pad, said slot having an edge which tapers downwardly towards the rear of said pad to aid in securing it to a parachute pack, means forming an impervious layer over the surface of said pad, and a valve associated with said means for varying the pressure in said pad.

4. A seat cushion comprising a porous rubber pad having a slot extending therethrough, said slot having an edge which tapers downwardly towards the rear of the pad to aid in securing the cushion to a person, said tapered edge being of substantial area to render the portion of the pad thereabove appreciably more resilient than the remainder of said pad, means forming an impervious layer over the entire surface of said pad but leaving said slot exposed, said means being in intimate contact with the entire surface of said pad, and valve means carried by said means whereby the air quantity in said pad can be varied to control the stiffness of said pad but is maintained at any given value regardless of the load applied to said pad.

5. A parachute seat cushion comprising a porous rubber pad having a slot having an edge of substantial area which tapers downwardly towards the rear of the pad formed therethrough to aid in securing the cushion to a parachute pack, a fabric envelope enclosing said rubber pad and covering all of the surface thereof but exposing said slot, said rubber pad totally filling said fabric envelope, a rubber coating associated with said fabric envelope to form an air-tight cover around said rubber pad, and valve means carried by said fabric envelope whereby the quantity of air in said pad can be varied to control the stiffness of said rubber pad but is maintained at any given value regardless of the load applied thereto.

RICHARD M. STONE.
ALAN E. RATHBUN.